US007412384B2

(12) United States Patent
Kondo et al.

(10) Patent No.: US 7,412,384 B2
(45) Date of Patent: Aug. 12, 2008

(54) DIGITAL SIGNAL PROCESSING METHOD, LEARNING METHOD, APPARATUSES FOR THEM, AND PROGRAM STORAGE MEDIUM

(75) Inventors: Tetsujiro Kondo, Tokyo (JP); Tsutomu Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 10/089,430

(22) PCT Filed: Jul. 31, 2001

(86) PCT No.: PCT/JP01/06595

§ 371 (c)(1), (2), (4) Date: Mar. 29, 2002

(87) PCT Pub. No.: WO02/13182

PCT Pub. Date: Feb. 14, 2002

(65) Prior Publication Data

US 2002/0184018 A1 Dec. 5, 2002

(30) Foreign Application Priority Data

Aug. 2, 2000 (JP) ............................ 2000-238895

(51) Int. Cl.
*G10L 15/08* (2006.01)

(52) U.S. Cl. ....................... 704/237; 704/216; 704/217

(58) Field of Classification Search ................. 704/237, 704/217, 216
See application file for complete search history.

(56) References Cited

U.S. PATENT DOCUMENTS

| | | | | |
|---|---|---|---|---|
| 5,430,826 | A * | 7/1995 | Webster et al. | 704/200 |
| 5,555,465 | A | 9/1996 | Kondo | |
| 5,739,873 | A | 4/1998 | Kondo | |
| 5,764,305 | A | 6/1998 | Kondo | |
| 5,903,866 | A | 5/1999 | Shoham | |
| 6,167,375 | A * | 12/2000 | Miseki et al. | 704/229 |
| 6,360,198 | B1 * | 3/2002 | Imai et al. | 704/207 |
| 2002/0138256 | A1 * | 9/2002 | Thyssen | 704/220 |

FOREIGN PATENT DOCUMENTS

| | | |
|---|---|---|
| EP | 0 865 028 A1 | 9/1998 |
| EP | 0 912 045 A1 | 4/1999 |
| JP | 57-144600 | 9/1982 |
| JP | 60-195600 | 10/1985 |
| JP | 4-115628 | 4/1992 |
| JP | 5-297898 | 11/1993 |

(Continued)

*Primary Examiner*—Richemond Dorvil
*Assistant Examiner*—Ql Han
(74) *Attorney, Agent, or Firm*—Frommer Lawrence & Haug LLP; William S. Frommer; Ellen Marcie Emas

(57) ABSTRACT

A digital signal processing method and learning method and devices therefor, and a program storage medium which are capable of further improving the waveform reproducibility of a digital signal. Self correlation coefficients are calculated by cutting parts out of the digital signal by multiple windows having different sizes, and the parts are classified based on the calculation results of the self correlation coefficients. Then, the digital signal is converted by the prediction method corresponding to the classified class, so that the conversion further suitable for the features of the digital signal can be conducted.

12 Claims, 7 Drawing Sheets

FOREIGN PATENT DOCUMENTS

| | | |
|---|---|---|
| JP | 5-323999 | 12/1993 |
| JP | 6-51800 | 2/1994 |
| JP | 2002 49383 | 2/1995 |
| JP | 7 67031 | 3/1995 |
| JP | 7 193789 | 7/1995 |
| JP | 8 275119 | 10/1996 |
| JP | 10-307599 | 11/1998 |
| JP | 10-313251 | 11/1998 |
| JP | 11-27564 | 1/1999 |
| JP | 2000-32402 | 1/2000 |
| JP | 2000-78534 | 3/2000 |
| JP | 2002 49384 | 2/2002 |
| JP | 2002 49395 | 2/2002 |
| JP | 2002 49396 | 2/2002 |
| JP | 2002 49397 | 2/2002 |
| JP | 2002 49400 | 2/2002 |
| WO | 98/51072 | 11/1998 |

* cited by examiner

DIGITAL SIGNAL PROCESSING METHOD, LEARNING METHOD, APPARATUSES FOR THEM, AND PROGRAM STORAGE MEDIUM

TECHNICAL FIELD

The present invention relates to a digital signal processing method and learning method and devices therefor, and a program storage medium, and is suitably applied to a digital signal processing method and learning method and devices therefor, and a program storage medium in which data interpolation processing is performed on digital signals by a rate converter or a PCM (Pulse Code Modulation) demodulation device.

BACKGROUND ART

Heretofore, oversampling processing to convert a sampling frequency to a value several times higher than the original value is performed before a digital audio signal is input to a digital/analog converter. With this arrangement, the phase feature of an analog anti-aliasing filter keeps the digital audio signal outputted from the digital/analog converter, at a constant level in the audible high frequency band, and prevents influences of digital image noises caused by sampling.

Typical oversampling processing employs a digital filter of the primary linear (straight line) interpolation system. Such digital filter is used for creating linear interpolation data by averaging plural pieces of existing data when the sampling rate is changed or data is missing.

Although the digital audio signal subjected to the oversampling processing has an amount of data several times more than that of the original data in the direction of time-axis because of linear interpolation, the frequency band of the digital audio signal subjected to the oversampling processing is not changed so much and the sound quality is not improved as compared with before. Moreover, since the data interpolated is not necessarily created based on the waveform of the analog audio signal before it is A/D converted, the waveform reproducibility is not improved at all.

Furthermore, in the case of dubbing digital audio signals having different sampling frequencies, the frequencies are converted by means of the sampling rate converter. In such cases, however, the linear digital filter can interpolate only linear data, so that it is difficult to improve the sound quality and waveform reproducibility. Furthermore, in the case where data samples of digital audio signal are missing, the same results as those of the above occurs.

DESCRIPTION OF THE INVENTION

The present invention has been done considering the above points and is to propose a digital signal processing method and learning method and devices therefor, and a program storage medium, which are capable of significantly improving the waveform reproducibility.

To obviate such problems, according to the present invention, a part is cut out of a digital signal with each of plural windows which are different in size to calculate a self correlation coefficient, and the parts are classified based on the calculation results, that is, the self-correlation coefficients, and then the digital signal is converted by a prediction method corresponding to this obtained class, so that the digital signal can be more suitably converted according to its features.

BEST MODE FOR CARRYING OUT THE INVENTION

With reference to the accompanying figures one embodiment of the present invention will be described.

Figure 1:
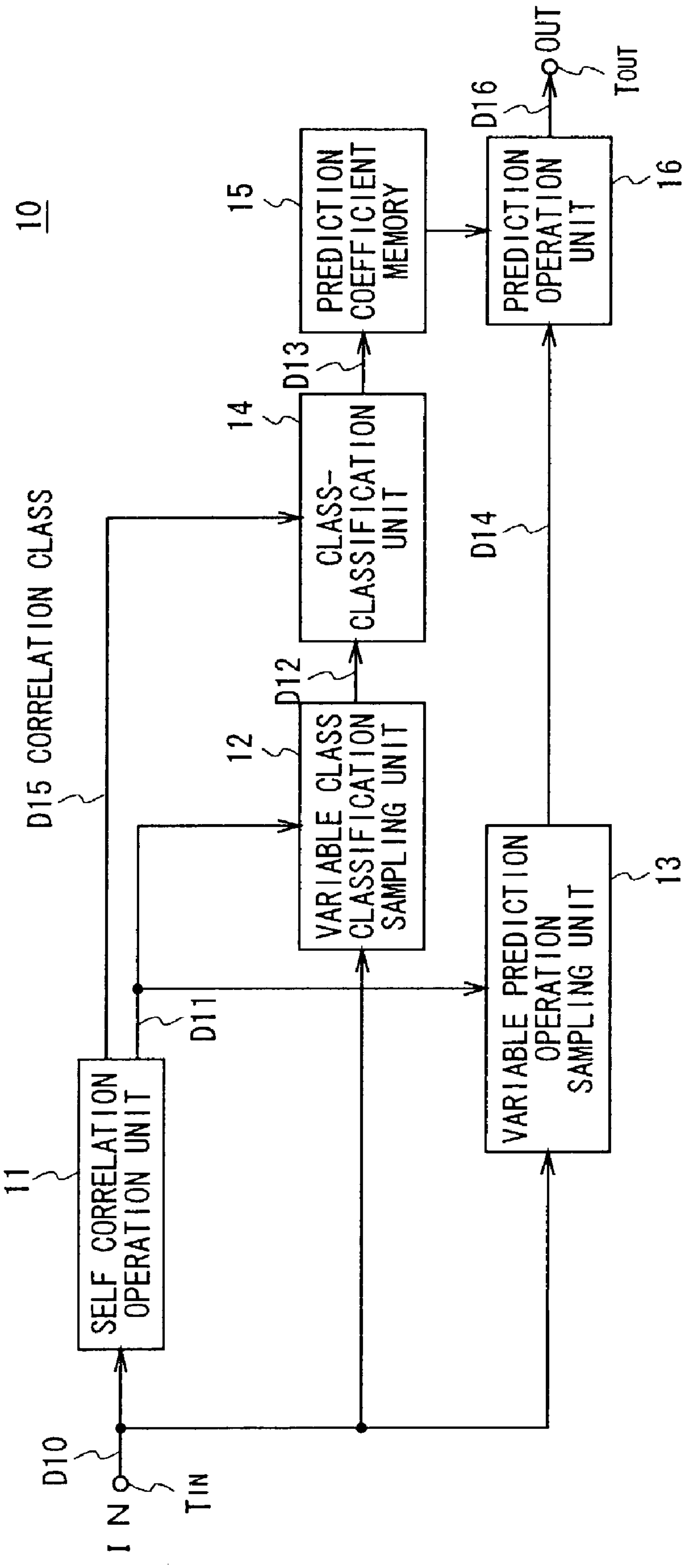
FIG. 1 is a functional block diagram showing the structure of an audio signal processing device according to the present invention.

Referring to FIG. 1, when the sampling rate of a digital audio signal (hereinafter referred to as audio data) is increased or the audio data is interpolated, an audio signal processing device 10 produces audio data having almost real value by class-classification application processing.

In this connection, audio data in this embodiment may be musical data of human being's voice and sounds of musical instruments and further, may be data of various other sounds.

More specifically, in the audio signal processing device 10, a self correlation operation unit 11, after cutting out parts of input audio data D10 which is input from an input terminal $T_{IN}$, by predetermined time as current data, calculates a self correlation coefficient based on each piece of the cut-out current data by a self correlation coefficient judgement method, that will be described later, and judges a cutting-out range in the time-axis and a phase change based on the calculated self correlation coefficient.

Then, the self correlation operation unit 11 supplies the result of judgement on the cutting-out range in the time-axis, which is obtained based on each piece of current data cut out at this time, to a variable class-classification sampling unit 12 and the variable prediction calculation sampling unit 13 as sampling control data D11, and it supplies the result of the judgement on the phase change to a class-classification unit 14 as a correlation class D15 expressed by one bit.

The variable class-classification sampling unit 12 samples some pieces of audio waveform data D12 to be classified (hereinafter, referred to as class taps) (six samples in this embodiment, for example) by cutting the specified ranges out of the input audio data D10, which is supplied from the input terminal $T_{IN}$, based on the sampling control data D11, which is supplied from the self correlation operation unit 11, and supplies them to the class-classification unit 14.

The class-classification unit 14 comprises an ADRC (Adaptive Dynamic Range Coding) circuit which compresses the class taps D12, which are sampled at the variable class-classification sampling unit 12, to form a compressed data pattern, and a class code generation circuit which obtains a class code to which the class taps D12 belongs.

The ADRC circuit forms pattern compressed data by, for example, compressing each class tap D12 from 8 bits to 2 bits.

This ADRC circuit conducts the adaptable quantization, and since it can effectively expresses the local pattern of the signal level with short word length, this ADRC circuit is used for generating a code for the class-classification of a signal pattern.

More specifically, in the case of class-classifying 6 pieces of 8-bit data (class taps), they should be classified into enormous number of classes such as $2^{48}$, thereby increasing the load on the circuit. Therefore, in the class-classification unit 14 of this embodiment, the class-classification is conducted based on the pattern compressed data, which is created at the ADRC circuit provided therein. For example, when the one-bit quantization is performed on six class taps, the six class taps can be expressed by six bits and can be classified to $2^6=64$ classes.

At this point, when the dynamic range of class tap is taken to be DR; the bit allocation is taken to be m, the value of each class tap to be L; and the quantization code is taken to be Q, the ADRC circuit conducts the quantization by evenly dividing data between the maximum value MAX and the minimum value MN into areas by the specified bit length, according to the following EQUATION (1).

$$DR = \mathrm{MAX} - \mathrm{MIN} + 1$$

$$Q = \{(L - \mathrm{MIN} + 0.5) \times 2^m / DR\} \quad (1)$$

In the EQUATION (1), { } means that decimal places are discarded. Thus, if each of six class taps sampled according to the judgement result of the self correlation coefficients calculated in the self correlation operation unit 11 is formed of eight bits (m=8), the class tap is compressed to two bits in the ADRC circuit.

Then, where the class taps compressed as described above are $q_n$ (n=1~6); the class code generation circuit provided in the class-classification unit 14 conducts the arithmetic operation as shown in the following EQUATION based on the compressed class taps $q_n$, thereby obtaining a class code (class) indicating the class to which the class taps ($q_1$~$q_6$) belongs.

$$\mathrm{class} = \sum_{i=1}^{n} q_i (2^P)^1 \quad (2)$$

At this point, the class code generation circuit integrates the correlation class D15 expressed by one bit, which is supplied from the self correlation operation unit 11, with the corresponding calculated class code (class). Then the class code generation circuit supplies class code data D13 indicating the resultant class code (class') to a prediction coefficient memory 15. This class code (class') indicates a readout address which is used in reading out a prediction coefficient from the prediction coefficient memory 15. In the EQUATION (2), n represents the number of compressed class taps $q_n$ and n=6 in this embodiment; and P represents the bit allocation compressed in the ADRC circuit and P=2 in this embodiment.

As described above, the class-classification unit 14 integrates the correlation class D15 with the corresponding class code of the class taps D12, which are sampled from the input audio data D10 in the variable class-classification sampling unit 12, to generate the resultant class code data D13, and supplies this to the prediction coefficient memory 15.

In the prediction coefficient memory 15, sets of prediction coefficients corresponding to respective class codes are memorized in addresses corresponding to the respective class codes. Then, a set of prediction coefficients $W_1$~$W_n$ memorized in the address corresponding to a class code is read out based on the supplied class code data D13 from the class-classification unit 14 and is supplied to a prediction operation unit 16.

Furthermore, supplied to the prediction operation unit 16 is audio waveform data (hereinafter referred to as prediction taps) D14 ($X_1$~$X_n$) to be prediction-operated, that are cut out and sampled based on the sampling control data D11 from the self correlation operation unit 11, in the variable prediction operation sampling unit 13, in the same manner as the variable class-classification sampling unit 12.

The prediction operation unit 16 conducts a product sum operation as shown in the following EQUATION by using the prediction taps D14 ($X_1$~$X_n$), which are supplied from the variable prediction operation sampling unit 13, and the prediction coefficients $W_1$~$W_n$, which are supplied from the prediction coefficient memory 15:

$$y' = W_1 X_1 + W_2 X_2 + \ldots + W_n X_n \quad (3)$$

As a result, the prediction result y' is obtained. This prediction value y' is sent out from the prediction operation unit 16 as audio data D16 with sound quality improved.

Figure 2:
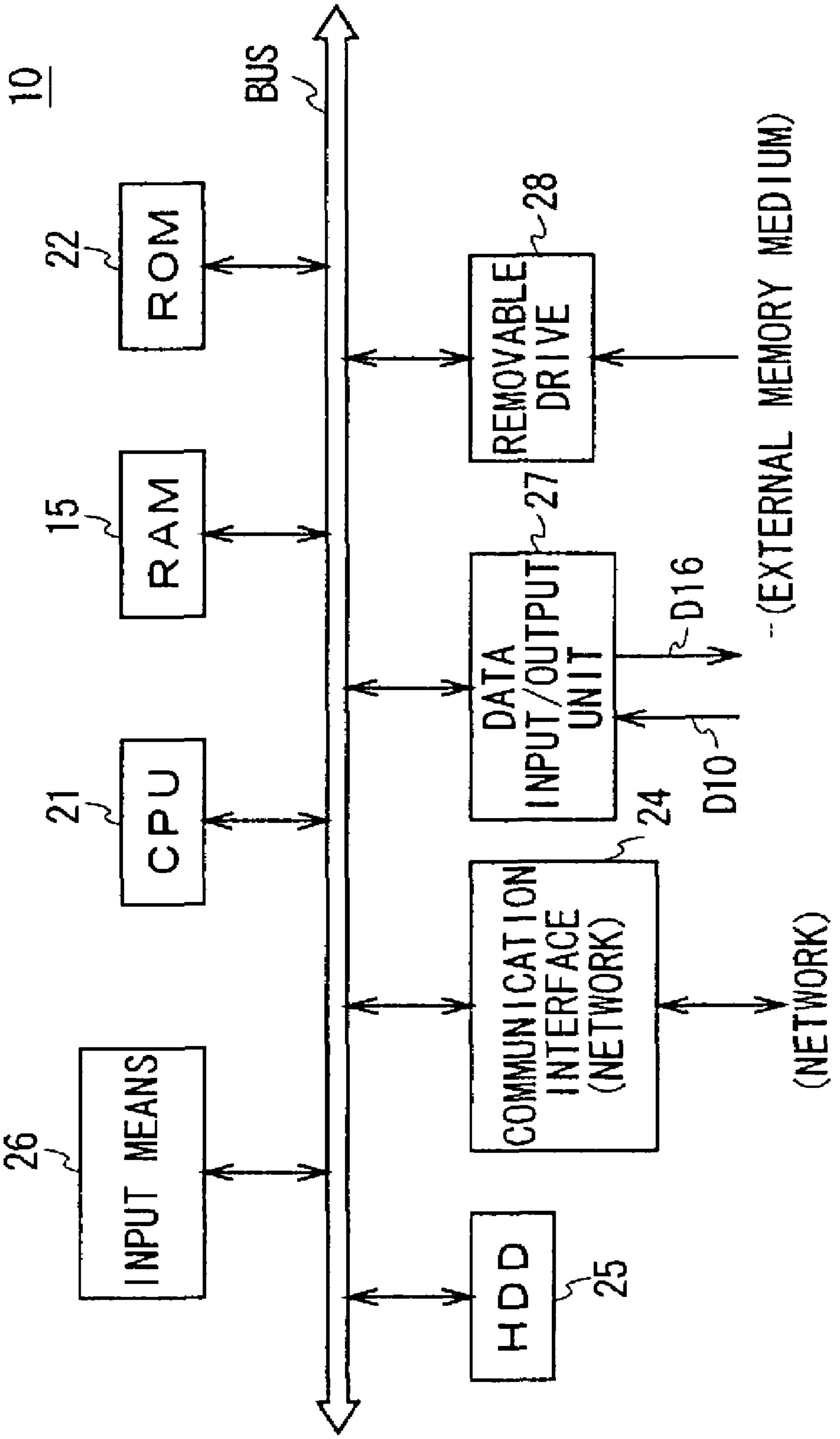
FIG. 2 is a block diagram showing the structure of the audio signal processing device according to the present invention.

In this connection, the structure of the audio signal processing device 10 is shown by the functional blocks described above in FIG. 1. And the detailed structure of the functional blocks is explained by referring to a device having a computer structure as shown in FIG. 2 in this embodiment. More specifically, the audio signal processing device 10 comprises a CPU 21, a ROM (read only memory) 22, a RAM (random access memory) 15 which is the prediction coefficient memory 15 and these circuits are connected to each other with a bus BUS. The CPU 21, by executing various programs stored in the ROM 22, functions as the functional blocks (the self correlation operation unit 11, the variable class-classification sampling unit 12, the variable prediction operation sampling unit 13, the class-classification unit 14 and the prediction operation unit 16) described above in FIG. 1.

In addition, the audio signal processing device 10 comprises a communication interface 24 for performing communication via a network, a removable drive 28 to read out information from an external memory medium such as a floppy disk and an optical magnetic disk. Also this audio signal processing device 10 can read various programs for conducting the class-classification adaptive processing as described in FIG. 1, via a network or from an external memory medium, in the hard disk of the hard disk device 25, in order to perform the class-classification adaptive processing according to the read-in programs.

The user enters a predetermined command via the input means 26 such as the keyboard and the mouse to make the CPU 21 execute the class-classification processing described above in FIG. 1. In this case, the audio signal processing device 10 enters the audio data (input audio data) D10 of which the sound quality should be improved, therein via the data input/output unit 27, and after applying the class-classification adaptive processing to the input audio data D10, it can output the audio data D16 with the sound quality improved, to the outside via the data input/output unit 27.

Figure 3:
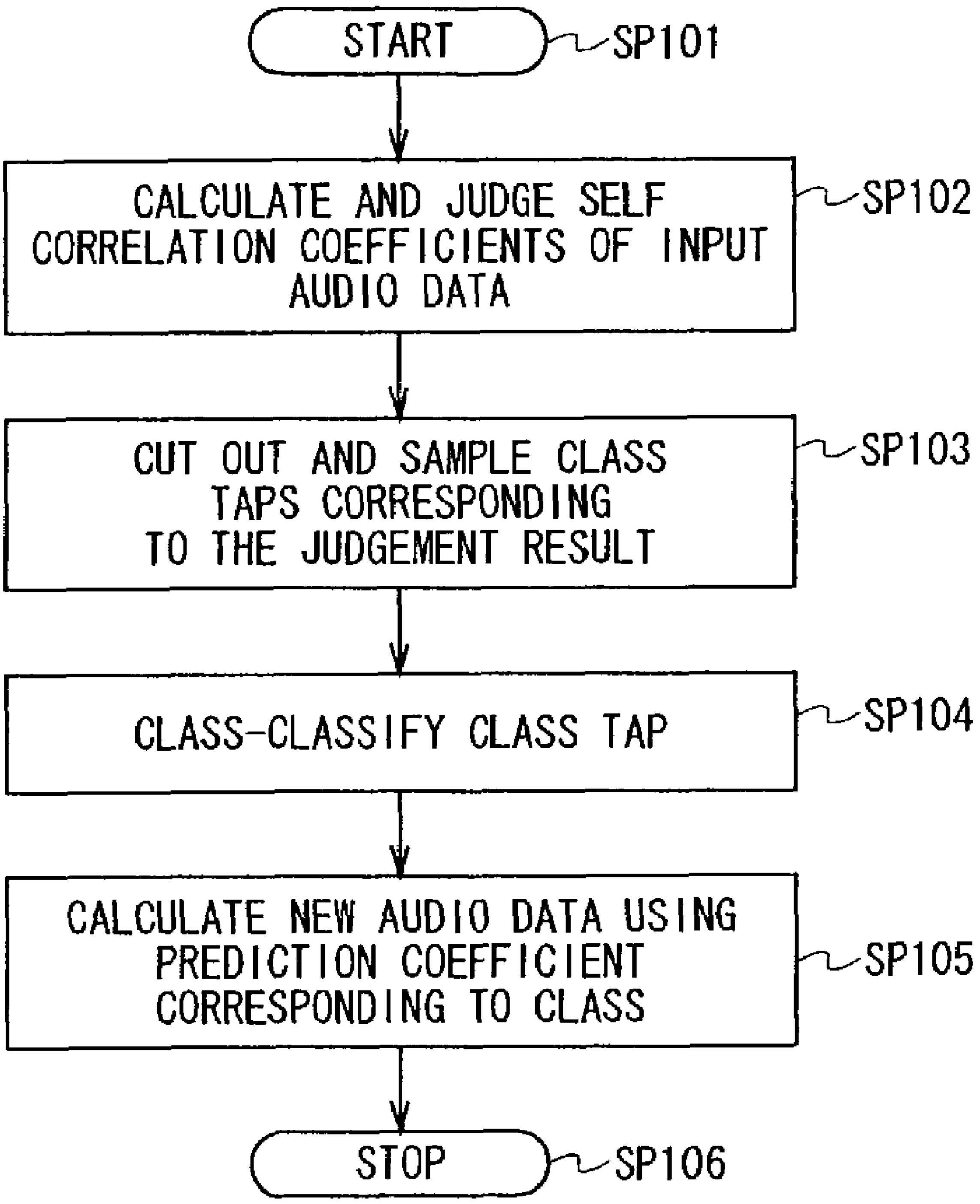
FIG. 3 is a flow chart showing an audio data conversion processing procedure.

In this connection, FIG. 3 shows the processing procedure of the class-classification adaptive processing in the audio signal processing device 10. The audio signal processing device 10 starts the processing procedure at step SP101 and at following step SP102, calculates a self correlation coefficient of the input audio data D10 and based on the calculated self correlation coefficient it judges the cutting-out range in the time-axis and the phase change, with the self correlation operation unit 11.

The judgement result on the cutting-out range in the time-axis (i.e., sampling control data D11) is expressed based on whether the feature part and its neighborhood of the input audio data D10 has similarity in the roughness of amplitude, and it defines a range to cut out the class taps and also defines a range to cut out the prediction taps.

Then, the audio signal processing device 10 moves to step SP103, and at the variable class-classification sampling unit 12, by cutting the specified range out of the input audio data D10 according to the judgement result (i.e., sampling control data D11), samples the class taps D12. Then, the audio signal processing device 10, moving to step SP104, conducts the class-classification to the class taps D12 sampled by the variable class-classification sampling unit 12.

Furthermore, the audio signal processing device 10 integrates the correlation class code obtained as a result of judgement on the phase change of the input audio data D10, with the class code obtained as a result of class-classification in the self correlation operation unit 11. And by utilizing the resulting class code, the audio signal processing device 10 reads out a prediction coefficients. Prediction coefficients are stored for each class by learning in advance. And by reading out the prediction coefficients corresponding to the class code, the audio signal processing device 10 can use the prediction coefficients matching to the feature of the input audio data D10 at that time.

The prediction coefficients read out from the prediction coefficient memory 15 are used for the prediction operation by the prediction operation unit 16 at step SP105. Thus, the input audio data D10 is converted to desired audio data D16 by the prediction operation suitable for the feature of the input audio data D10. Thus, the input audio data D10 is converted to the audio data D16 of which the sound quality is improved, and the audio signal processing device 10, moving to step SP106, terminates the processing procedure.

Next, the self correlation coefficient judgement method of the input audio data D10 in the self correlation operation unit 11 of the audio signal processing device 10 will be explained.

Figure 4:
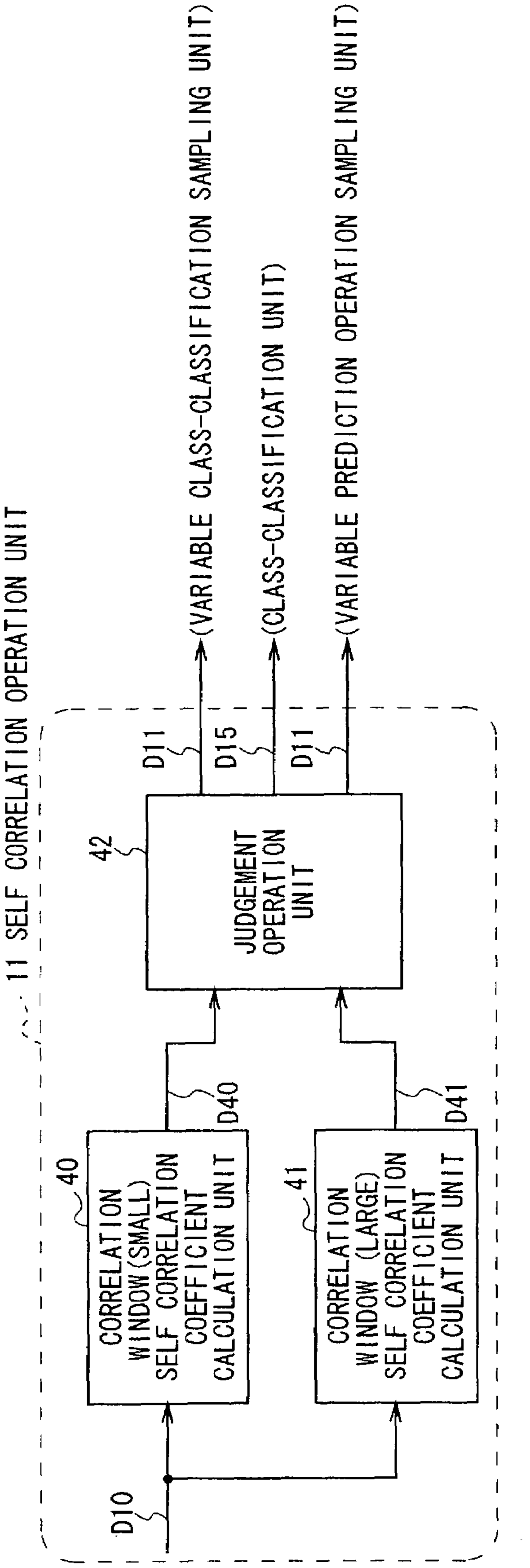
FIG. 4 is a block diagram showing the structure of a self correlation operation unit.

In FIG. 4, the self correlation operation unit 11 cuts parts out of the input audio data D10, which is supplied from the input terminal $T_{IN}$ (FIG. 1), at predetermined intervals as current data and supplies the current data cut out at this time to self correlation coefficient calculation units 40 and 41.

The self correlation coefficient calculation unit 40 multiplies the current data cut out, by the Hamming window according to the following EQUATION:

$$W[k]=0.54-0.46*\cos(2\pi*k/N)(k=0, \ldots ,N) \quad (4)$$

Figure 5:
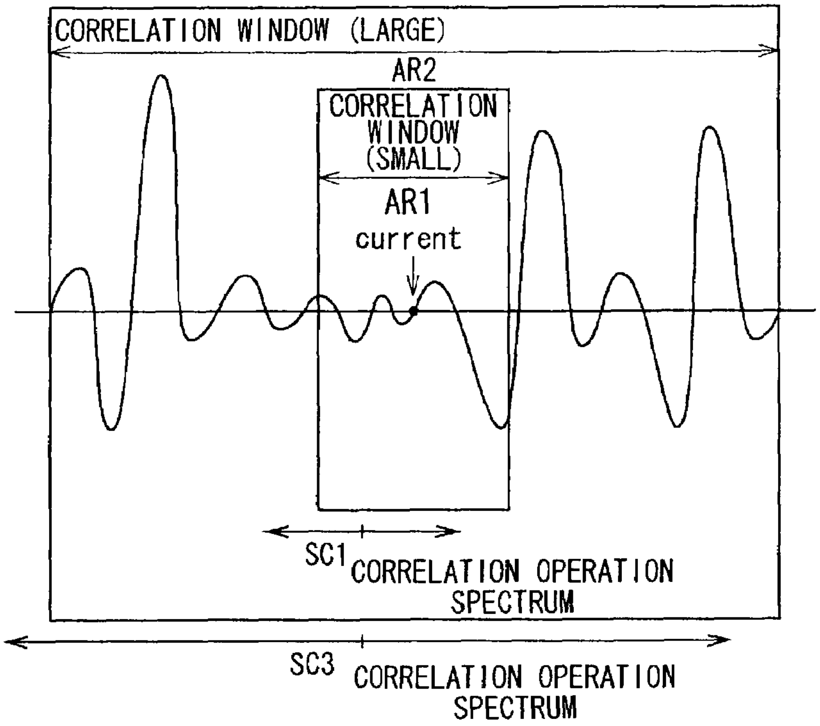
FIG. 5 is a brief linear diagram illustrating a self correlation coefficient judgement method.

Then, as shown in FIG. 5, the self correlation coefficient calculation unit 40 cuts out search range data AR1 (hereinafter referred to as a correlation window (small)) having the right and left sides symmetrical with regard to the target time point (current).

In this connection, in Equation (4), “N” shows the number of samples of the correlation windows, and “k” shows the k-th sample data.

Furthermore, the self correlation coefficient calculation unit 40 is to select a self correlation operation spectrum set in advance, based on the correlation window (small) cut out, so that based on the correlation window (small) AR1 cut out at this time, it selects, for example, a self correlation operation spectrum SC1.

$$R(t) = \frac{1}{N-t}\sum_{i=0}^{N-1-t} g(i)g(i+t) \quad (5)$$

Then, according to the above EQUATION, the self correlation coefficient calculation unit 40 multiples the signal waveform g(i) formed of N pieces of sampling values by the signal waveform g(i+t) delayed by the delay time t, accumulates them and then averages the resultant, to calculate the self correlation coefficient D40 of the self correlation operation spectrum SC1 and supplies this to the judgement operation unit 42.

On the other hand, the self correlation coefficient calculation unit 41, by multiplying the current data cut out, by the Hamming window using the same calculation as the EQUATION (4), like the self correlation coefficient calculation unit 40, to cut out the search range data AR2 (hereinafter referred to as the correlation window (large)) having the right and left sides symmetrical with regard to the target time point (current) (FIG. 5).

In this connection, the number of samples “N” used by the self correlation coefficient calculation unit 40 in EQUATION (4) is set smaller than the number of samples “N” used by the self correlation coefficient calculation unit 41 in EQUATION (4).

Furthermore, out of the self correlation operation spectra set in advance, the self correlation coefficient calculation unit 41 is to select a self correlation operation spectrum in correspondence with the self correlation operation spectrum of the correlation window (small) cut out and therefor, it selects a self correlation operation spectrum SC3 corresponding to the self correlation operation spectrum SC1 of the correlation window (small) AR1 cut out at this moment. Then, the self correlation coefficient calculation unit 41 calculates the self correlation coefficient D42 of the self correlation operation spectrum SC3 using the same operation as the above EQUATION (5), and supplies this to the judgement operation unit 42.

The judgment operation unit 42 is to judge the cutting-out ranges in the time-axis of the input audio data D10 based on the self correlation coefficients supplied from the self correlation coefficient calculation units 40 and 41. And if there exists a deviation between the value of the self correlation coefficient D40 and the value of the self correlation coefficient D41 supplied from the self correlation coefficient calculation units 40 and 41 respectively, this shows that the condition of audio waveform expressed in digital, which is contained in the correlation window AR1 and the condition of audio waveform expressed in digital, which is contained in the correlation window AR2 are different. That is, this shows that audio waveforms of the correlation windows AR1 and AR2 have no similarity.

Accordingly, the judgment operation unit 42 judges that it is necessary that the size of the class tap and the size of prediction tap (cutting-out ranges in the time-axis) should be shortened in order to significantly improve the prediction operation by finding out the feature of input audio data D10 inputted at this time.

Accordingly, the judgement operation unit 42 forms sampling control data D11 to cut out the same class tap and prediction tap (cutting-out ranges in the time-axis) in size as the correlation window (small) AR1, and supplies this to the variable class-classification sampling unit 12 (FIG. 1) and the variable prediction operation sampling unit 13 (FIG. 1).

Figure 6:
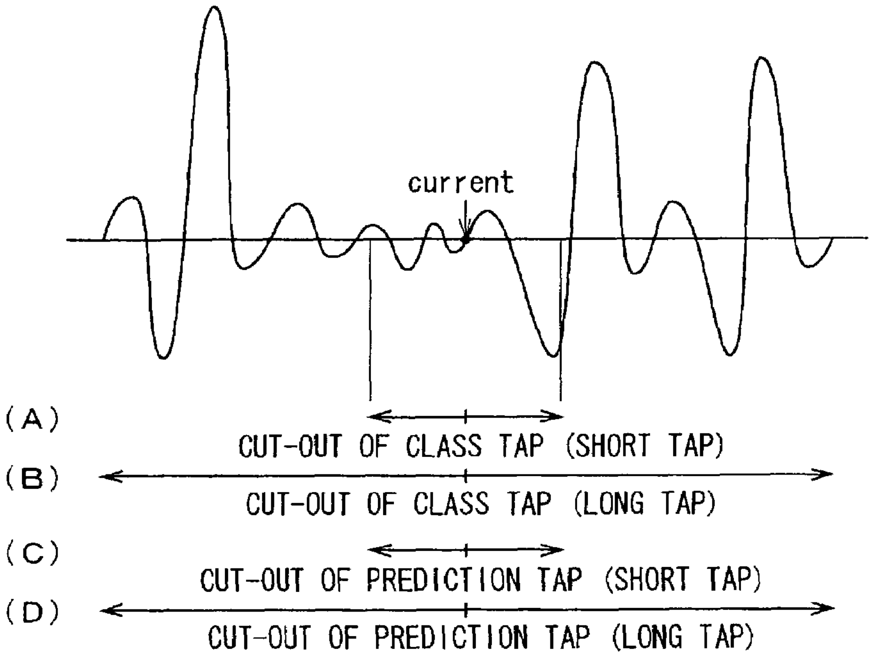
FIG. 6 is a brief linear diagram showing examples of tap cutout.

In this case, in the variable class-classification sampling unit 12 (FIG. 1), a short class tap is cut out by the sampling control data D11 as shown in FIG. 6(A), and in the variable prediction operation sampling unit 13 (FIG. 1), a short prediction tap is cut out in the same size as the class tap by the sampling control data D11 as shown in FIG. 6(C).

On the other hand, in the case where there is no deviation between the value of the self correlation coefficient D40 and the value of the self correlation coefficient D41 supplied from the self correlation coefficient calculation units 40 and 41 respectively, this shows that the condition of audio waveform expressed in digital, which is contained in the correlation window AR1 and the condition of audio waveform expressed in digital, which is contained in the correlation window AR2 are not different, i.e., this shows that the audio waveforms are similar.

In this case, the judgment operation unit 42 judges that it is capable of finding out the feature of the input audio data D10 and is capable of conducting the prediction calculation even when the sizes of the class tap and the prediction tap (cutting-out ranges in the time-axis) are made longer.

Thus, the judgement operation unit 42 generates sampling control data D11 to cut out the same class tap and prediction tap (cutting-out ranges in the time-axis) in size as the correlation window (large) AR2, and supplies this to the variable class-classification sampling unit 12 (FIG. 1) and the variable prediction operation sampling unit 13 (FIG. 1).

In this case, in the variable class-classification sampling unit 12 (FIG. 1), a long class tap is cut out based on the sampling control data D11 as shown in FIG. 6(B). And the variable prediction operation sampling unit 13 (FIG. 1) cuts out the same prediction tap in size as the class tap, based on the sampling control data D11 as shown in FIG. 6(D).

Furthermore, the judgement operation unit 42 is to conduct the judgement of phase change of the input audio data D10 based on self correlation coefficients supplied from the self correlation coefficient calculation units 40 and 41. And at this moment, if the big difference exists between the value of the self correlation coefficient D40 and the value of the self correlation coefficient D41 supplied from the self correlation coefficient calculation units 40 and 41 respectively, this means that audio waveforms are in the abnormal condition with no similarity, then the judgement operation unit 42 raises the correlation class D15 expressed by one bit (i.e., makes it to "1") and supplies this to the class-classification unit 14.

On the other hand, if there is no deviation between the value of self correlation coefficient D40 and the value of self correlation coefficient D41 supplied from the self correlation coefficient calculation units 40 and 41, this means that audio waveforms are similar. Hence, the judgement operation unit 42 does not raise the correlation class D15 expressed by one bit (i.e., "0") and supplies this to the class-classification unit 14.

Accordingly, when audio waveforms of the correlation windows AR1 and AR2 are in the abnormal conditions with no similarity, the self correlation operation unit 11 generates the sampling control data D11 to cut out short taps in order to improve the prediction operation by finding out the features of the input audio data D10. And when audio waveforms of the correlation windows AR1 and AR2 are in the normal state with similarity, the self correlation operation unit 11 can generate the sampling control data D11 to cut out long taps.

Furthermore, if audio waveforms of correlation windows AR1 and AR2 are in the abnormal state with no similarity, the self correlation operation unit 11 raises the correlation class D15 expressed by one bit (i.e., makes it to "1") and on the other hand, when the waveforms of the correlation windows AR1 and AR2 are in the normal state with similarity, the self correlation operation unit 11 does not raise the correlation class D15 expressed by 1 bit (i.e., "0"), then it supplies the correlation class D15 to the class-classification unit 14.

In this case, the audio signal processing device 10 integrates the correlation class D15 supplied from the self correlation operation unit 11 with the class code (class) obtained as a result of class-classification of the class taps D12 supplied from the variable classification sampling unit 12 at that time, it can conduct the prediction operation by more frequent class-classification. And thus, the audio signal processing device 10 can generate the audio data of which the audio quality is significantly improved.

In this connection, the present embodiment has described the case where each of the self correlation coefficient calculation units 40 and 41 selects one self correlation operation spectrum. The present invention, however, is not only limited to this but also a plurality of self correlation operation spectra may be selected.

Figure 7:
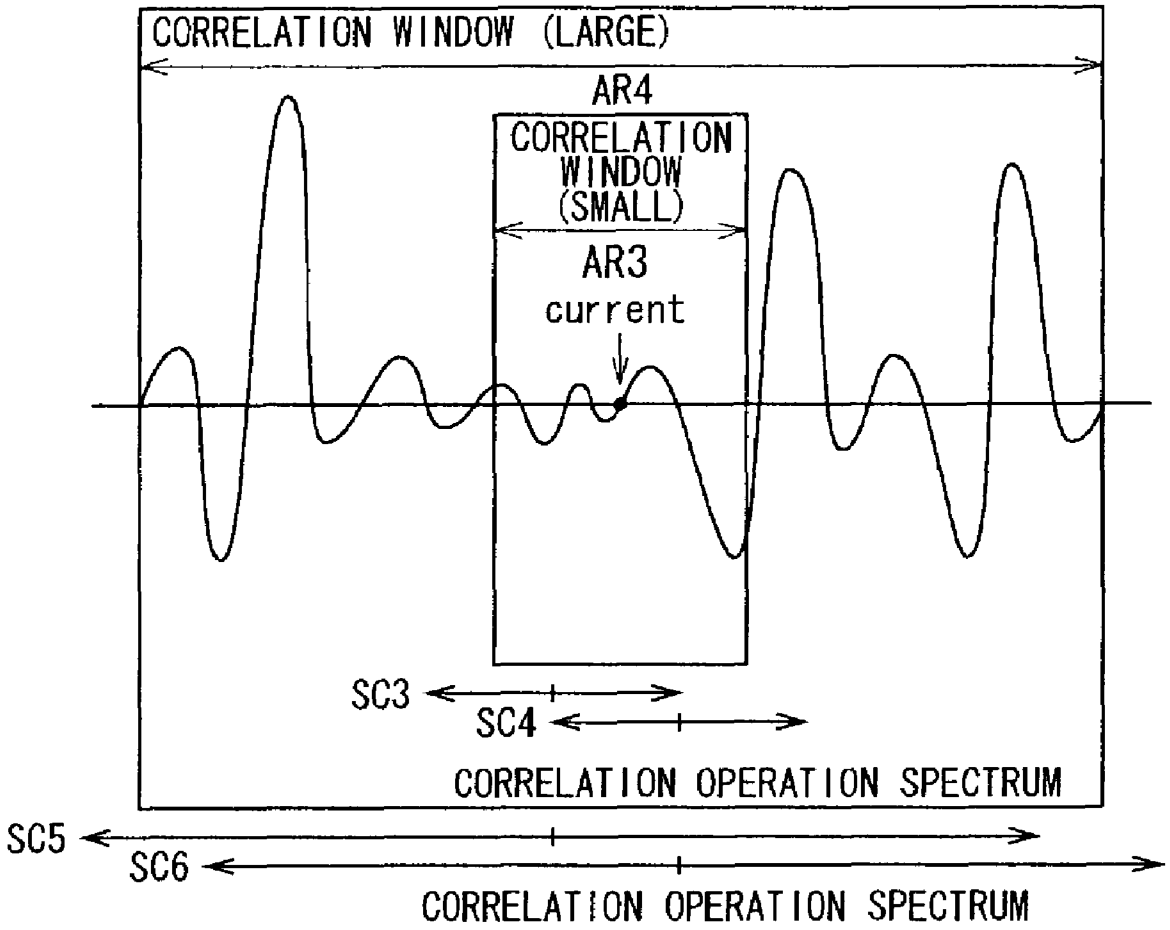
FIG. 7 is a brief linear diagram explaining the self correlation coefficient judgement method according to another embodiment.

In this case, when the self correlation coefficient calculation unit 40 (FIG. 4) selects preset self correlation operation spectra based on the correlation window (small) AR3 cut out at that time, it selects self correlation operation spectra SC3 and SC4 as shown in FIG. 7, and calculates self correlation coefficients of the selected self correlation operation spectra SC3 and SC4 by the same arithmetic operation as that of EQUATION (5) described above. Furthermore, the self correlation coefficient calculation unit 40 (FIG. 4), by averaging the self function coefficients of the self correlation operation spectra SD3 and SC4 calculated respectively, supplies the newly calculated self function coefficient to the judgement operation unit 42 (FIG. 4).

On the other hand, the self correlation coefficient calculation unit 41 (FIG. 4) selects self correlation operation spectra SC5 and SC6 corresponding to the self correlation operation spectra SC3 and SC4 of the correlation window (small) AR3 cut out at that time, and calculates self correlation coefficients of the selected self correlation operation spectra SC5, SC6 by the same arithmetic operation as that of the EQUATION (5) described above. Moreover, the self correlation coefficient calculation unit 41 (FIG. 4), by averaging the self function coefficients of the self correlation operation spectra SC5 and SC6, supplies the newly calculated self function coefficient to the judgement operation unit 42 (FIG. 4).

When each self correlation coefficient calculation unit selects multiple self correlation operation spectra as described above, it secures wider self correlation operation spectra. Thus, the self correlation coefficient calculation unit can calculate a self correlation coefficient using more samples.

Next, a learning circuit for obtaining a set of prediction coefficients for each class to be memorized in the prediction coefficient memory 15, which is described in FIG. 1, by learning in advance will be explained.

Figure 8:
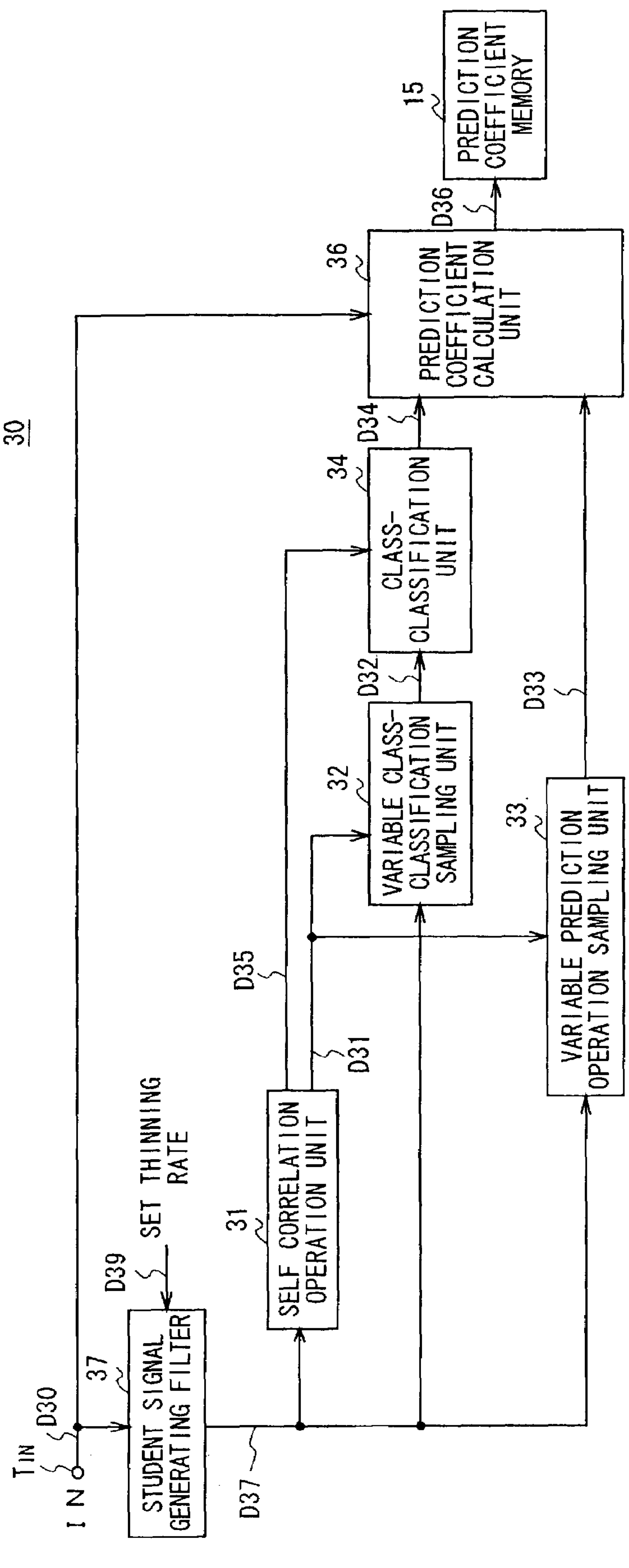
FIG. 8 is a block diagram showing the structure of a learning circuit according to the present invention.

In FIG. 8, the learning circuit 30 receives teacher audio data D30 with high sound quality at a student signal generating filter 37. The student signal generating filter 37 thins out the teacher audio data D30 at the thinning rate set by a thinning rate setting signal D39, at predetermined intervals for the predetermined samples.

In this case, prediction coefficients to be obtained are different depending upon the thinning rate in the student signal generating filter 37, and audio data to be reformed by the audio signal processing device 10 differ accordingly. For example, in the case of improving the sound quality of audio data by increasing the sampling frequency in the audio signal processing device 10, the student signal generating filter 37 conducts the thinning processing to decrease the sampling frequency. On the other hand, when the audio signal processing device 10 improves the sound quality by supplementing data samples dropped out of the input audio data D10, the student signal generating filter 37 conducts the thinning processing to drop out data samples.

Thus, the student signal generating filter 37 generates the student audio data D37 through the predetermined thinning processing from the teacher audio data D30, and supplies this to the self correlation operation unit 31, the variable class-classification sampling unit 32 and the variable prediction operation sampling unit 33.

The self correlation operation unit 31, after dividing the student audio data D37, which is supplied from the student signal generating filter 37, into ranges at predetermined intervals (for example, by six samples in this embodiment), calculates the self correlation coefficient of the waveform of each time-range obtained by the self correlation coefficient judgement method described above in FIG. 4. And based on the self correlation coefficient calculated, the self correlation operation unit 31 judges the cutting-out range in the time-axis and the phase change.

Based on the self correlation coefficient of the student audio data D37 calculated at this time, the self correlation operation unit 31 supplies the judgement result on the cutting-out range in the time-axis to the variable class-classification sampling unit 32 and the variable prediction operation sampling unit 33 as sampling control data D31, and simultaneously, it supplies the judgement result of the phase change to the class-classification unit 14 as correlation data D35.

Furthermore, the variable class-classification sampling unit 32, by cutting the specified range out of the student audio data D37 supplied from the student signal generating filter 37, based on the sampling control data D31 supplied from the self correlation operation unit 31, samples class taps D32 to be class-classified (in this embodiment, six samples for example) and supplies this to the class-classification unit 34.

The class-classification unit 34 comprises an ADRC (Adaptive Dynamic Range Coding) circuit to form a compressed data pattern upon compressing the class taps D32 sampled in the variable class-classification sampling unit 32 and a class code generation circuit to generate a class code to which the class taps D32 belongs.

The ADRC circuit, by conducting the operation to compress each class tap D32 from 8 bits to 2 bits, forms pattern compressed data. This ADRC circuit is a circuit to conduct the adaptable quantization. Since this circuit can effectively express a local pattern of the signal level with a short word length, it is used for generating a code for the class-classification of the signal pattern.

More specifically, in the case of class-classifying 6 pieces of 8-bit data (class tap), it is necessary to classify them into enormous numbers of classes such as $2^{48}$, thereby increasing the load on the circuit. This class-classification unit 34 of this embodiment performs the class-classification based on the pattern compressed data which is formed in the ADRC circuit provided therein. For example, if the 1-bit quantization is executed to 6 class taps, the 6 class taps can be expressed by 6 bits and classified into $2^6=64$ classes.

At this point, if the dynamic range of the class tap is taken to be DR, the bit allocation is m, the data level of each class tap is L, and the quantization code is Q, the ADRC circuit conducts the quantization by evenly dividing the range between the maximum value MAX and the minimum value MIN by the specified bit length, according to the same arithmetic operation as that of EQUATION (1) described above. Accordingly, if each of 6 class taps sampled according to the judgement result of self correlation coefficients (sampling control data D31) calculated in the self correlation operation unit 31 is formed of 8 bits (m=8) for example, the class tap is compressed to 2 bits respectively in the ADRC circuit.

If thus compressed class taps are taken to be $q_n$ (n=1~6) respectively, the class code generation circuit provided in the class-classification unit 34 executes the same arithmetic operation as that of the EQUATION (2) described above based on the compressed class tap $q_n$, and calculates a class code (class) showing a class to which that class taps ($q_1$~$q_6$) belong.

At this point, the class code generation circuit integrates the correlation data D35 supplied from the self correlation operation unit 31 with the corresponding class code (class) calculated, and supplies the class code data D34 showing the resulting class code (class') to the prediction coefficient memory 15. This class code (class') shows the readout address which is used when prediction coefficients are read out from the prediction coefficient memory 15. In this connection, in the EQUATION (2), n represents the number of compressed class taps $q_n$ and n=6 in this embodiment. Moreover, P is a bit allocation compressed in the ADRC circuit and P=2 in this embodiment.

With this arrangement, the class-classification unit 34 integrates the correlation data D35 with the corresponding class code of the class taps D32 sampled from the student audio data D37 in the variable class-classification sampling unit 32, and forms the resultant class code data D34 and supplies this to the prediction coefficient memory 15.

Furthermore, the prediction taps D33 ($X_1$~$X_n$) cut out and sampled and to be used for the prediction operation, similar to the variable class-classification sampling unit 32, based on the sampling control data D31 from the self correlation operation unit 31, in the variable prediction computing sampling unit 33 are supplied to the prediction coefficient calculation unit 36.

The prediction coefficient calculation unit 36 forms a normal equation by using the class code data D34 (class code class') supplied from the class-classification unit 34, prediction taps D33 and the teacher audio data D30 with high sound quality supplied from the input terminal $T_{IN}$.

More specifically, where levels of n samples of the student audio data D37 are taken to be $x_1, x_2, \ldots, x_n$ respectively, and the quantization data as a result if p bits of ADRC are taken to be $q_1, \ldots, q_n$. At this point, the class code (class) of this range is defined as the Equation (2) described above. Then, where levels of the student audio data D37 are taken to be $x_1$, $X_2, \ldots, x_n$ respectively, and the level of teacher audio data D30 with the high sound quality is taken to be y, the linear estimation equation of n tap according to the prediction coefficients $w_1, w_2, \ldots, w_n$ is set for each class code as follows:

$$y=W_1X_1+W_2X_2+\ldots+W_nX_n \tag{6}$$

In this connection, the coefficient $W_n$ is unknown prior to learning.

The learning circuit 30 learns multiple audio data for each class code. When the number of data samples is M, the following Equation is set according to EQUATION (6).

$$y=W_1X_{k1}+W_2X_{k2}+\ldots W_nX_{kn} \tag{7}$$

Provided that k=1, 2, . . . M.

When M>n, prediction coefficients $w_1, \ldots w_n$ are not decided uniquely. Therefore, elements of the error vector are defined as follows:

$$e_k=y_k-\{W_1X_{k1}+W_2X_{k2}+\ldots W_nX_{kn}\} \tag{8}$$

Provided that k=1, 2, . . . M. Then, the prediction coefficient is obtained so that the following EQUATION (9) is the minimum. That is, the minimum square method is used.

$$e^2 = \sum_{k=0}^{M} e_k^2 \tag{9}$$

At this point, the deviated differential coefficient of $w_n$ is obtained according to EQUATION (9). In this case, each $W_n$ (n=1~6) may be obtained so that the following EQUATION (10) becomes to "0".

$$\frac{\partial e^2}{\partial wi} = \sum_{k=0}^{M} 2\left[\frac{\partial e_k}{\partial wi}\right] e_k = \sum_{k=0}^{M} 2x_{k1} \cdot e_k \tag{10}$$

$$(i = 1, 2, \ldots\ n)$$

Then, if $X_{ij}$ and $Y_i$ would be defined as following EQUATIONS, $$X_{ij} = \sum_{p=0}^{M} x_{pi} \cdot x_{pj} \tag{11}$$

$$Y_i = \sum_{k=0}^{M} x_{ki} \cdot y_k \tag{12}$$

the EQUATION (10) is expressed as follows, by using the matrix:

$$\begin{bmatrix} X_{11} & X_{12} & \cdots & X_{1n} \\ X_{21} & X_{22} & & X_{2n} \\ \vdots & \vdots & & \\ X_{m1} & X_{m2} & \cdots & X_{mn} \end{bmatrix} \begin{bmatrix} W_1 \\ W_2 \\ \vdots \\ W_n \end{bmatrix} = \begin{bmatrix} Y_1 \\ Y_2 \\ \vdots \\ Y_n \end{bmatrix} \tag{13}$$

This equation is generally called as the normal equation. In this connection, n=6.

After all learning data (the teacher audio data D30, class code "class", prediction tap D33) are input, the prediction coefficient calculation unit 36 creates the normal equation shown in EQUATION (13) described above for each class code "class", and by using the general matrix method such as the sweeping out method, to obtain each $W_n$, and calculates prediction coefficients for each class code. The prediction coefficient calculation unit 36 writes the obtained prediction coefficients (D36) in the prediction coefficient memory 15.

As a result of such learning, prediction coefficients to assume the high sound quality audio data y for each pattern to be regulated by the quantization data $q_1, \ldots, q_6$ are stored for each class code in the prediction coefficient memory 15. This prediction coefficient memory 15 is used in the audio signal processing device 10 described above in FIG. 1. By this processing, learning of prediction coefficients for generating the audio data with high sound quality from the normal audio data according to the linear estimation formula is terminated.

Accordingly, in the learning circuit 30, the student signal generating filter 37 conducts the thinning processing of teacher audio data with high sound quality, thereby obtaining the prediction coefficients for the digital audio processing in the audio signal processing device 10.

According to the foregoing structure, the audio signal processing device 10 calculates the self correlation coefficient in the time waveform range of the input audio data D10 with the self correlation operation unit 11. The judgement result by the self correlation operation unit 11 varies according to the sound quality of the input audio data D10. And the audio signal processing device 10 specifies the class based on the judgement result of the self correlation coefficients of the input audio data D10.

The audio signal processing device 10 obtains prediction coefficients to obtain audio data without deviation and with high sound quality (teacher audio data), for each class in advance in learning, and conducts the prediction calculation on input audio data D10 class-classified based on the judgement result of the self correlation coefficients, by the prediction coefficients corresponding to that class. Thus, the input audio data D10 is prediction-operated using the prediction coefficients corresponding that sound quality, so that the sound quality is improved to the degree sufficient for practical use.

Furthermore, at the time of learning for obtaining prediction coefficients for each class, by obtaining the prediction coefficients corresponding numerous pieces of teacher audio data with different phases, even if the phase change occurs during the class-classification adaptive processing of the input audio data D10 in the audio signal processing device 10, the processing corresponding to the phase change can be conducted.

According to the foregoing structure, since the input audio data D10 is class-classified based on the judgement result of self correlation coefficients in the time waveform range of the input audio data D10 and the input audio data D10 is prediction-operated utilizing the prediction coefficients based on the result of the class-classification, the input audio data D10 can be converted to the audio data D16 with much higher sound quality.

The embodiment described above has described the case where the self correlation operation units 11 and 31 calculates the self correlation coefficients by conducting the arithmetic operation according to the EQUATION (5) using the time-axis waveform data (the self operation spectrum SC1 selected based on the correlation window (small) and the self operation spectrum SC2 selected from the correlation window (large) corresponding to the self operation spectrum SC1). The present invention, however, is not only limited to this but also self correlation coefficients may be calculated, by calculating conversion data according to EQUATION (5) after converting the inclined polarity to the data expressed as the feature vector focusing attention onto the inclined polarity of time-axis waveform.

In this case, since the amplitude element of the conversion data which is obtained by conversion so as to express the inclined polarity of the time-axis waveform as the feature vector is eliminated, the self correlation coefficient calculated according to the EQUATION (5) is obtained as a value which does not depend on the amplitude. Accordingly, a self correlation operation unit for computing the conversion data according to EQUATION (5) can obtain self correlation coefficient which further depends on the frequency element.

As described above, if the conversion data, which is obtained by conversion, is computed according to the EQUATION (5) after converting the inclined polarity to the data expressed as the feature vector focusing attention onto the inclined polarity of the time-axis waveform, the self correlation coefficient which further depends on the frequency element can be obtained.

Furthermore, the embodiment described above has described the case of expressing, by one bit, the correlation class D15 which is the result of the judgement of phase change conducted by the self correlation operation units 11 and 13. However, the present invention is not only limited to this but also this can be expressed by multi bits.

In this case, the judgement operation unit 42 of the self correlation operation unit 11 (FIG. 4) forms the correlation class D15 expressed by multi bits (quantization) according to the differential value between the value of self correlation coefficient D40 and the value of self correlation coefficient D41 supplied from the self correlation coefficient calculating units 40 and 41 and supplies this to the class-classification unit 14.

Then, the class-classification unit 14 conducts the pattern compression onto the correlation class D15 expressed by multi bits supplied from the self correlation operation unit 11 in the ADRC circuit described above in FIG. 1, and calculates the class code (class 2) indicating the class to which the correlation class D15 belongs. Moreover, the class-classification unit 14 integrates the class code (class 2) calculated with respect to the correlation class D15 with the class code (class 1) calculated with respect to the class tap D12 supplied from the variable class-classification sampling unit 12, and supplies the resultant class code data indicating the class code (class 3) to the prediction coefficient memory 15.

Furthermore, the self correlation operation unit 31 of the learning circuit for memorizing a set of prediction coefficients corresponding to the class code (class 3) forms the correlation class D35 expressed by multi bits (quantization), as in the case of the self correlation operation unit 11, and supplies this to the class-classification unit 34.

Then, the class-classification unit 34 pattern-compresses the correlation class D35 expressed by multi bits supplied from the self correlation operation unit 31, in the ADRC circuit described above in FIG. 8, and calculates the class code (class 5) indicating the class to which the correlation classes D35 belongs. Moreover, at this moment, the class-classification unit 34 integrates the class code (class 5) calculated on the correlation classes D35 with the class code (class 4) calculated on the class taps D32 supplied from the variable class-classification sampling unit 32, and supplies the class code data indicating the resultant class code (class 6) to the prediction coefficient calculation unit 36.

With this arrangement, the correlation class that is the result of judgement of phase change conducted by the self correlation computing unit 11, 31 can be expressed by multi bits. And thus the frequency of class-classification can be further increased. Accordingly, the audio signal processing device which conducts the prediction calculation of the input audio data by using the prediction coefficients based on a result of class-classification can convert audio data to audio data with much higher sound quality.

Furthermore, the embodiment described above has dealt with the case of carrying out multiplication by using the Hamming window as the window function. The present invention, however, is not only limited to this but also by using another window function such as the Blackman window in place of the Hamming window, the multiplication may be conducted.

Furthermore, the embodiment described above has dealt with the case of using the primary linear method as the prediction system. The present invention, however, is not only limited to this but also, in short, the result of learning may be used, such as the method by multi-dimensional function. In the case where digital data supplied from the input terminal $T_{IN}$ is image data, various prediction systems, such as the method to predict from the pixel value itself can be applied.

Furthermore, the embodiment described above has dealt with the case of conducting the ADRC as the pattern forming means to form a compressed data pattern. The present invention, however, is not only limited to this but also the compression means such as the differential pulse code modulation (DPCM) and the vector quantization (VQ) may be used. In short, if information compression means can express the signal waveform pattern with small number of classes, it may be acceptable.

Moreover, the embodiment described above has dealt with the case where the audio signal processing device (FIG. 2) executes the audio data conversion processing procedure according to the programs. The present invention, however, is not only limited to this but also such functions may be realized by the hardware structure and installed in various digital signal processing devices (such as a rate converter, an oversampling processing device, a PCM (Pulse Code Modulation) to be used for the BS (Broadcasting Satellite)), or by loading these programs from a program storage medium (floppy disk, optical disc, etc.) in which programs to realize various functions are stored, into various digital signal processing devices, these function units may be realized.

According to the present invention as described above, parts are cut out of the digital signal by multiple windows having different sizes to calculate respective self correlation coefficients, and the parts are classified based on the calculation results of self correlation coefficients and then, the digital signal is converted according to the prediction system corresponding to the obtained class, so that the conversion suitable for the features of digital signal can be conducted. Thus, the conversion to the high quality digital signal having further improved waveform reproducibility can be realized.

INDUSTRIAL UTILIZATION

The present invention can be utilized for a rate converter, a PCM decoding device and an audio signal processing device which perform data interpolation processing on digital signals.

The invention claimed is:

1. A digital audio signal processing method for converting a digital audio signal, comprising:

- a step of cutting parts out of the digital audio signal by plural windows having different sizes;
- a step of calculating a self correlation coefficient, based on each cut-out part of the digital audio signal;
- a step of determining cut-out ranges of time and phase changes based on the self correlation coefficients;
- a step of compressing the cut-out ranges to form compressed data patterns;
- a step of classifying the compressed data patterns into classes based on the phase changes;
- a step of selecting a set of prediction coefficients based upon classification of the compressed data patterns; and
- a step of generating a new digital audio signal based upon the prediction coefficients and the cut-out ranges.

2. The digital audio signal processing method as defined in claim 1,

- wherein in said step of calculating the self correlation coefficients, at least a general searching range and a local searching range are provided as targets for calculating the self correlation coefficients with respect to the digital audio signal, and the self correlation coefficients are calculated based on the searching ranges.

3. A digital audio signal processing device for converting a digital audio signal, comprising:

- self correlation coefficient calculation means for cutting parts out of the digital audio signal by plural windows having different sizes;
- means for calculating a self correlation coefficient based on each cut-out part of the digital audio signal;
- means for determining cut-out ranges of time and phase change based on the self correlation coefficient;
- means for compressing the cut-out ranges to form compressed data patterns;

class-classification means for classifying the compressed data patterns into classes based on the phase changes;

selection means for selecting a set of prediction coefficients based on the compressed data patterns; and prediction calculation means for generating a new digital audio signal based upon the prediction coefficients and the cut-out ranges.

4. The digital audio signal processing device as defined in claim 3, wherein said self correlation coefficient calculation means is provided with at least a general searching range and a local searching range as targets for calculating the self correlation coefficients with respect to the digital audio signal, and calculates the self correlation coefficients based on the searching ranges.

5. A computer memory medium having stored thereon program executed by a digital audio processing device, comprising the steps of:

a step of cutting parts out of the digital audio signal by plural windows having different sizes;

a step of calculating a self correlation coefficient for each cut-out part;

a step of determining cut-out ranges of time and phase changes based on the self correlation coefficients;

a step of compressing the cut-out ranges to form compressed data patterns:

a step of classifying the compressed data patterns into classes based on the phase changes;

a step of selecting a set of prediction coefficients based upon classification of the compressed data patterns; and a step of generating a new digital audio signal based upon the prediction coefficients and the cut-out ranges.

6. The computer memory medium as claimed in claim 5, wherein in said step of calculating the self correlation coefficients, at least a general searching range and a local searching range are provided as targets for calculating the self correlation coefficients with respect to the digital audio signal and the self correlation coefficients are calculated based on the searching ranges.

7. A learning method for generating prediction coefficients which are used for prediction calculation of conversion processing by a digital signal processing device for converting a digital audio signal, said learning method comprising:

a step of generating, from a desired digital audio signal, a student digital audio signal in which the digital audio signal is degraded;

a step of cutting parts out of the student digital audio signal by plural windows having different sizes;

a step of calculating a self correlation coefficient for each cut-out part, a step of determining cut-out ranges of time and phase changes based on the self-correlation coefficients;

a step of compressing the cut-out ranges to form compressed data patterns;

a step of classifying the compressed data patterns into classes based on the phase changes;

a step of calculating prediction coefficients corresponding to the class based on the digital audio signal and the student digital audio signal; and a step of storing the prediction coefficients associated with each class.

8. The learning method as claimed in claim 7, wherein in said step of calculating the self correlation coefficients, at least a general search range and a local search range are provided as targets for calculating targets of the self correlation coefficients, and the self correlation coefficients are calculated based on the searching ranges.

9. A learning device for generating prediction coefficients which are used for prediction calculation of conversion processing by a digital signal processing device for converting a digital audio signal, said learning device comprising:

student digital signal processing means for generating, from a desired digital audio signal, a student digital audio signal in which the digital signal is degraded;

self correlation coefficient calculation means for cutting parts out from the student digital audio signal by multiple windows having different sizes;

means for calculating a self correlation coefficient for each cut-out part, means for determining cut-out ranges of time and phase change based on the self correlation coefficient;

means for compressing the cut-out ranges to form compressed data patterns;

class-classification means for classifying the compressed data patterns into classes based on the phase changes;

prediction coefficient calculation means for calculating prediction coefficients corresponding to the class based on the digital audio signal and the student digital audio signal; and storage means for storing the prediction coefficients associated with each class.

10. The learning device as defined in claim 9, wherein said self correlation coefficient calculation means is provided with at least a general searching range and a local searching range with respect to the digital audio signal as targets for calculating the self correlation coefficients and calculates the self correlation coefficients based on the searching ranges.

11. A computer memory medium having stored thereon program that is executed by a learning device, comprising the steps of:

a step of generating, from a desired digital audio signal, a student digital audio signal in which the digital audio signal is degraded;

a step of cutting parts out of the student digital audio signal by plural windows having different sizes;

a step of calculating a self correlation coefficient for each cut-out part;

a step of determining cut-out ranges of time and phase changes based on the self-correlation coefficients;

a step of compressing the cut-out ranges to form compressed data patterns;

a step of classifying the compressed data patterns into classes based on the phase changes;

a step of calculating the prediction coefficients corresponding to the class based on the digital audio signal and the student digital audio signal; and a step of storing the prediction coefficients associated with each class.

12. The computer memory medium as claimed in claim 11, wherein in said step of calculating self correlation coefficients, at least a general searching range and local searching range are provided with respect to the digital audio signal as calculation targets of the self correlation coefficients and the self correlation coefficients are calculated based on the searching ranges.

* * * * *